(12) United States Patent
Jacobsen et al.

(10) Patent No.: US 10,945,819 B2
(45) Date of Patent: Mar. 16, 2021

(54) PLUGGABLE IMPLANT

(71) Applicant: Global Machining Solutions, Ltd., Kefar Veradim (IL)

(72) Inventors: Hagay Jacobsen, Kefar Veradim (IL); Aaron Hoffman, Mazor (IL)

(73) Assignee: Global Machining Solutions, Ltd., Kefar Veradim (IL)

( * ) Notice: Subject to any disclaimer, the term of this patent is extended or adjusted under 35 U.S.C. 154(b) by 0 days.

(21) Appl. No.: 16/062,695

(22) PCT Filed: Dec. 11, 2016

(86) PCT No.: PCT/IL2016/051324
§ 371 (c)(1),
(2) Date: Jun. 15, 2018

(87) PCT Pub. No.: WO2017/103921
PCT Pub. Date: Jun. 22, 2017

(65) Prior Publication Data
US 2018/0368950 A1    Dec. 27, 2018

(30) Foreign Application Priority Data

Dec. 15, 2015    (IL) .......................................... 243144

(51) Int. Cl.
*A61C 8/00*    (2006.01)
(52) U.S. Cl.
CPC ............ *A61C 8/0037* (2013.01); *A61C 8/008* (2013.01); *A61C 8/0028* (2013.01); *A61C 8/0022* (2013.01)

(58) Field of Classification Search
CPC ...... A61C 8/0037; A61C 8/0028; A61C 8/008
See application file for complete search history.

(56) References Cited

U.S. PATENT DOCUMENTS

| 6,273,720 | B1 * | 8/2001 | Spalten | ................ A61C 8/0009 |
| | | | | 433/172 |
| 7,934,929 | B2 | 3/2011 | Better et al. | |
| 8,029,284 | B2 | 10/2011 | Better et al. | |
| 8,356,994 | B2 | 1/2013 | Better et al. | |
| 8,662,891 | B2 | 3/2014 | Uchitel et al. | |
| 2011/0076640 | A1 * | 3/2011 | Jones | ................. A61B 17/3472 |
| | | | | 433/89 |
| 2013/0011815 | A1 * | 1/2013 | Henig | .................... A61C 9/008 |
| | | | | 433/174 |

* cited by examiner

*Primary Examiner* — Ralph A Lewis
(74) *Attorney, Agent, or Firm* — Rahman LLC

(57) ABSTRACT

A pluggable implant is disclosed that is comprising an implant body extending between a distal end and an apical end, and comprising a cavity extending from the distal end towards the apical end, the cavity capable of accommodating a plug insertable from the distal end towards the apical end, such that when the plug is fully inserted and located in its apically-most position, the plug seals the cavity. Moreover, there is a method for plugging a hollow implant is disclosed, the implant comprising an implant body extending between a distal end and an apical end, and comprising a cavity extending from the distal end towards the apical end; wherein a plug is removably inserted into the implant through the cavity from the distal end towards the apical end such that when the plug is in fully inserted position and located in its apically-most position, the plug seals the cavity.

17 Claims, 2 Drawing Sheets

PLUGGABLE IMPLANT

FIELD OF THE INVENTION

The present application relates to implants, generally, designed and/or configured to be implantable within a living body. More specifically this application discloses a generally hollow, removably pluggable implants.

BACKGROUND OF THE INVENTION

Background of the invention is for informational purposes only and does not necessarily admit that subsequently mentioned information and/or publications are prior art.

Generally, implantable devices are numerous, well-known and wide-spread. Occasionally, a generally hollow implantable device, or 'implant', in short, may be called for, to facilitate transfer of materials, and/or light, there trough. In such occasions, removably plugging the hollow within the implant may be desirable.

One such exemplary-only device is disclosed in U.S. Pat. No. 8,662,891 to Ilan Uchitel, Gideon Fostick, Hadar Better, and Yossi Gross, titled "Implants, tools, and methods for sinus lift and lateral ridge augmentation". There is disclosed, inter allia, " . . . This additional advancing of the implant advances lateral surface 42 of implant 30 at least until lateral opening 44 is positioned entirely within the bore in ridge 200 and/or in regenerative material 230 in cavity 220. Such positioning of both ends of lumen 40 within bone substantially reduces the risk of infection, because proximal end 34 of implant 30 that is exposed to the oral cavity or gingiva is permanently closed. Typically, the surgeon couples a cover screw to the proximal end of the implant using a hand driver, and sutures the gingiva.

"For some applications, after decoupling delivery tube 50 from implant 30 and before further advancing the implant, the surgeon plugs lateral opening 44 of implant 30, using a plug (configuration not shown). The plug may be configured to be (a) screwed in, (b) pushed in by friction or a Morse taper, and/or (c) glued in using a cement or adhesive. Alternatively or additionally, the plug may comprise a cement or adhesive material that solidifies in opening 44. Optionally, the outer surface of the plug is treated using known techniques for implant surface treatment to enhance osseointegration." [Figures and reference numerals are not shown herein].

Similarly, US 20130011815 to Itzhak Henig, Oded Nahlieli, Shmuel Shmueli, and Hagay Jacobsen, titled "Dental implants, devices and methods associated with dental implantation procedures", discloses, inter allia, "The implant 300 further comprises a plug system 316 configured for selectively controlling fluid communication between an outside of proximal portion 310 and an outside of the distal part 354 through passageway 330, via proximal opening 362 and via lateral distal openings 358 and/or axial distal opening 359. In particular, the plug system 316 is configured for selectively and reversibly closing the distal openings independently of the proximal opening being open or closed, or independently of the prosthesis (including its prosthesis mounting arrangement) being mounted or unmounted (i.e., fixed or not fixed) with respect to the dental implant.

"In this embodiment, plug system 316 comprises a distal plug 315 and a proximal plug 314, and, referring in particular to FIGS. 11(a) to 11(c), a tool 370 can be advantageously used to facilitate selectively inserting and removing the distal plug 315 and the proximal plug 314 from the implant body 305." [Figures and reference numerals are not shown herein].

Removable plugs may be desirable to prevent unwanted ingress and/or egress of materials and/or contaminants to and/or from an implant. Numerous advantages and features of the presently disclosed pluggable implant invention may become readily apparent from the following detailed description of the invention and embodiment thereof, from the claims and from the accompanying drawings.

SUMMARY OF THE INVENTION

In the following disclosure, aspects thereof are described and illustrated in conjunction with systems and methods which are meant to be exemplary and illustrative, not limiting in scope.

Accordingly, it is an object of the present invention to provide a novel implantable device that both facilitates easy transfer of matter and/or electro-magnetic signal to and from an implantable site, while facilitating a sealing of the implanted site from undesired ingress of bit attachment which is removably connected to commercially available drill bits secured in a commercially available drill driving device.

One aspect of the present invention generally concerns a pluggable implant, comprising an implant body extending between a distal end and an apical end. The pluggable implant comprises a cavity extending from the distal end towards the apical end. The meeting of the cavity and the distal end defines a distal opening. This cavity can accommodate a plug which may be inserted from the distal opening towards the apical end. As the plug is fully inserted into the cavity, it is located in its apically-most position. In this position, the plug seals the cavity.

Optionally, the apical end may have a smooth, sealed apical face.

Potentially, the implant body is of a general prismatic, and/or body of revolution shape, having a longitudinal axis extending between the apical end and the distal end thereof, and merging therewith.

Further, the implant body comprises a peripheral envelope extending between the distal end and the epical end. Possibly, the implant body may be provided with one, or more, openings formed in the peripheral envelope adjacent the apical end. Such one or more openings may lead inwardly of the envelope through the implant body, to merge with the cavity forming corresponding one or more ducts.

Potentially, the distal end may be equipped with any known and/or discovered connector to facilitate interfacing with other objects.

Further potentially, the connector may be in a form of a socket.

Moreover, the peripheral envelope may be smooth and/or rough and/or threaded and/or provided with protrusions, along its entire length and/or periphery, and/or partially, to facilitate inserting and/or grasping of the implanted site.

Possibly, the cavity may extend away from the connector, to comprise a distal cavity extending away from the connector to merge with an apical cavity.

Further possibly, the distal cavity may be threaded, while the apical cavity may be smooth.

Yet further possibly, the apical cavity may comprise a distal bore merging with an apical bore through a distally-facing step.

Yet even further possibly, the apical bore may extend in a direction away from the step towards a cavity bottom to merge therewith.

Potentially, the pluggable implant may comprise a removable plug to facilitate plugging of the pluggable implant. The plug may have a generally body-of-revolution form having a longitudinal plug axis extending generally between a distally-disposed head and a generally opposing apically-disposed tail, with a peripheral shroud extending therebetween and merging therewith. The head and the tail may be substantially co-axial with each other and with the plug axis.

Moreover, the head of the plug may be equipped with any known and/or discovered connector to facilitate interfacing with other objects, and potentially, such a connector may comprise a socket.

Furthermore, the plug may comprise a generally distally-disposed stud having a stud shroud extending in a direction generally axially away from the head towards the tail.

Additionally, the stud may extend away from the head to merge with a head pin having a head shroud.

Further additionally, the head pin may extends away from the stud to merge with a tail pin having a tail shroud.

Yet further additionally, the head shroud and the tail shroud merge through a generally apically-facing tread, with the tail pin extending away from the tread towards the tail, to merge therewith.

Moreover, the stud shroud may be threaded, to complement, and/or correspond with, the threaded distal cavity.

Further, the head shroud, the tail shroud, and the interconnecting, interposed, tread may be smooth.

Possibly, the implant axis and the plug axis substantially merge and co-align.

Potentially, in a fully inserted position, the plug is accommodated within the cavity such that the threaded distal cavity meshes with, and accommodates, the complementary threaded stud.

Further, the distal bore fittingly accommodates the head pin and the apical bore fittingly accommodates the tail pin.

Further yet, in the fully inserted position, the distally-facing step abuts the apically-facing tread to act as a stop, thereby aiming to at least partially limit material passage therealong.

Furthermore, the tail of the plug stands away from a bottom of the cavity forming a gap therebetween.

Another potential aspect of the present disclosure is concerned with a method for removably plugging a hollow implant with one removable plug. The plug is insertable into a cavity extending inside an implant body from a distal end thereof towards an apical end thereof. The cavity meets the distal end forming a distal opening. The removable plug is insertable into the cavity from the distal opening towards the apical end, removably sealing the implant adjacent the apical end.

It is therefore one of the objects of the present application to provide a hollow, potentially pluggable implant, to facilitate at least a reduction in transfer of materials and/or contaminants, to and/or from, an implantable site. In addition to the exemplary aspects and embodiments described above, further aspects and embodiments will become apparent by reference to the figures and by study of the following detailed descriptions.

BRIEF DESCRIPTION OF THE DRAWINGS

Exemplary and/or illustrative embodiments of the present invention will be presented herein below in the following figures, by way of example only. The present disclosure may be best understood from the following detailed description when read in connection with the accompanying drawings. In the drawings, like portions have the same reference numerals. It should be emphasized that according to common practice, various features of the drawings are not drawn to scale unless otherwise indicated. On the contrary, dimensions of various features, and/or the features themselves, may be expanded and/or reduced and/or roughly shown and/or omitted entirely, to show details of particular components, in a purpose that the present disclosure may become more fully understood from the detailed description and the accompanying schematic figures. Reference will now be made to the accompanying drawings, in which.

DETAILED DESCRIPTION OF THE INVENTION

As required, a schematic, exemplary-only embodiment of the present application is disclosed herein; however, it is to be understood that the disclosed embodiment is merely exemplary of the present disclosure, which may be embodied in various and/or alternative forms. Specific structural and functional details disclosed herein are not to be interpreted as limiting, but merely as a basis for the claims and as a representative basis for teaching one skilled in the art to variously employ the present disclosure in virtually any appropriately detailed structure.

Aspects, advantages and/or other features of the exemplary embodiment of the disclosure will become apparent in view of the following detailed description, which discloses various non-limiting embodiments of the invention. In describing exemplary embodiments, specific terminology is employed for the sake of clarity. However, the embodiments are not intended to be limited to this specific terminology. It is to be understood that each specific portion includes all technical equivalents that operate in a similar manner to accomplish a similar purpose.

Exemplary embodiments may be adapted for many different purposes and are not intended to be limited to the specific exemplary purposes set forth herein. Those skilled in the art would be able to adapt the exemplary-only embodiment of the present disclosure, depending for example, on the intended use of adapted embodiment. Moreover, examples and limitations related therewith brought herein below are intended to be illustrative and not exclusive. Other limitations of the related art will become apparent to those of skill in the art upon a reading of the following specification and a study of the related figures.

The present application discloses an implant that may be implanted in a bone, and transfer substance and/or light, to and/or from the implanted region. It will be appreciated by a person skilled in the art that such implants may be fashioned as monolithic as well as assembled implants. Furthermore, such implants may be formed in any known or discovered manner, such as, but not limited to, molding, sintering, casting, forming and/or machining methods and/or any combination thereof, and from any appropriate, known or discovered materials, such as, but not limited to, metals, engineering plastics, and/or synthetics and/or composites and/or ceramics, as best fits a specific application thereof.

Figure 1:
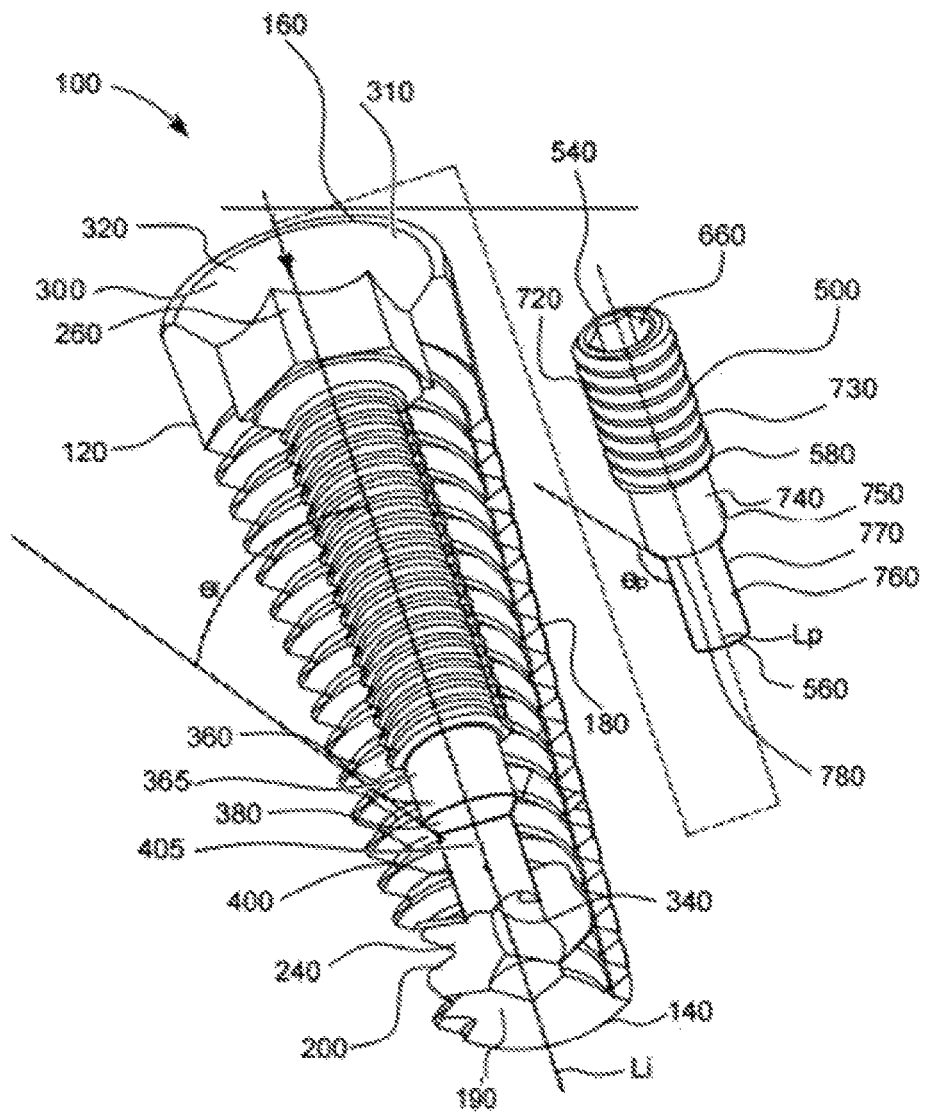
FIG. 1 illustrates a general schematic side view of a removably pluggable implant in accordance with an exemplary embodiment of the present disclosure.
Figure 2:
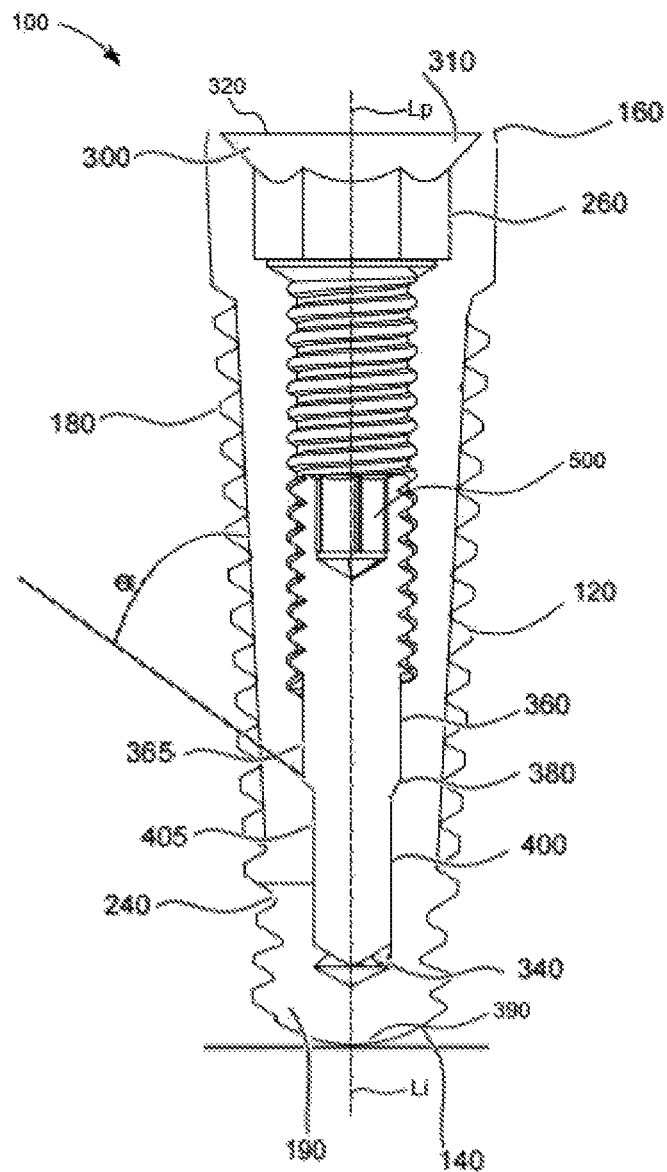
FIG. 2 illustrates a general schematic longitudinal section view of the exemplary-only embodiment shown in FIG. 1.

FIGS. 1 and 2 of the present disclosure illustrate an exemplary-only embodiment of a pluggable implant 100.

Possibly, the implant 100 may be embodied as comprising an implant body 120 having a generally body-of-revolution form having an implant longitudinal axis Li extending generally between a substantially co-axial apical end 140 and an opposing distal end 160, with a peripheral envelope 180 extending therebetween and merging therewith. The apical end 140 may have smooth apical face 190. Possibly, the apical end 140 may be provided with one, or more, openings 200, leading inwardly of the implant body 120 through corresponding ducts 240. The distal end 160 may be equipped with any known and/or discovered connector to facilitate interfacing with other objects [not shown]. In the present, exemplary-only embodiment of implant 100, the connector may be in a form of a socket 260. The peripheral envelope 180 may be smooth and/or rough and/or threaded and/or provided with protrusions, along its entire length and/or periphery, and/or partially, to facilitate inserting and/or grasping.

The implant body 120 may be provided with a generally longitudinal cavity 300 extending generally away from a distally-disposed opening 310 towards the one or more ducts 240, merging therewith. The cavity 300 extends away from the connector, and in this exemplary-only embodiment of the implant 100—away from the socket 260 and comprises a distal cavity 320 extending away from the socket 260 and merging with an apical cavity 340. The distal cavity 320 may be threaded, while the apical cavity 340 may be smooth. The apical cavity 340 comprises a distal bore 360 having a distal face 365 merging with an apical face 405 of an apical bore 400 through a distally-facing step 380. The apical bore 400 extends in a direction away from the step 380 towards a bottom 390 of the cavity 300 to merge therewith.

In the specific, exemplary-only embodiment shown here, the step 380 extends generally transversely to the distal face 365 and the apical face 405. More specifically, the step 380 may extend away from and generally transversely to the distal face 365 towards the apical face 405 forming a generally radial angle θi between the implant longitudinal axis Li and the step 380. The value of θi may include any possible angle values including angle ranging between 5° and 175° and preferably between 45° and 135° as measured between the implant longitudinal axis Li and the step 380. The step 380 may be planar, and/or non-planar, as may best fit a particular application.

The exemplary-only implant 100 comprises a removable plug 500 to facilitate plugging of the implant 100. It will be appreciated by a person skilled in the art that such plugs may be fashioned as monolithic as well as assembled plugs. Furthermore, such plugs may be formed in any known or discovered manner, such as, but not limited to, molding, sintering, casting, forming and/or machining methods and/or any combination thereof, and from any appropriate, known or discovered materials, such as, but not limited to, metals, engineering plastics, and/or synthetics and/or composites and/or ceramics, as best fits a specific application thereof.

The plug 500 has a generally body-of-revolution form having a plug longitudinal axis Lp extending generally between a substantially co-axial distally-disposed head 540 and an opposing apically-disposed tail 560, with a peripheral shroud 580 extending therebetween and merging therewith. The head 540 may be equipped with any known and/or discovered connector [not shown] to facilitate interfacing with other objects [not shown]. In the present, exemplary-only embodiment of implant 100, the connector for the plug 500 may be in a form of a socket 660.

The plug 500 comprises a generally distally-disposed stud 720 having a stud shroud 730 extending in a direction generally axially away from the head 540 to merge with a head pin 740 comprising a head shroud 750. The head pin 740 extends away from the stud 720 to merge with a tail pin 760 having a tail shroud 770 through a generally apically-facing tread 780. The head shroud 750 and the tail shroud 770 are substantially co-axial. The tread 780 extends therebetween and merges therewith.

In the specific, exemplary-only embodiment shown here, the tread 780 extends generally transversely to the head shroud 750 and the tail shroud 770. More specifically, the tread 780 may extend away from and generally transversely to the head shroud 750 towards the tail shroud 770 forming a generally radial angle θp between the plug longitudinal axis Lp and the tread 780. The value of θp may include any possible angle values including angle ranging between 5° and 175° and preferably between 45° and 135°. Generally, the step angle θi and the tread angle θp may be similar and/or correspond, but may not necessarily be identical. The tread 780 may be planar, and/or non-planar, as may best fit a particular application. The tail pin 760 extends away from the tread 780 towards the tail 560 to merge therewith. The stud shroud 730 may be threaded, to complement, and/or correspond with, the threaded distal cavity 320. The head shroud 750 of head pin 740, the tail shroud 770 of the tail pin 760, and the connecting, interposed, tread 780 may be smooth.

Attention is presently requested to FIG. 2. A longitudinal section through the implant 100 is shown. The implant axis Li and the plug axis Lp substantially merge and co-align. In a fully inserted position, the plug 500 is accommodated within the cavity 300. Preferably, the threaded distal cavity 320 meshes with, and accommodates, the complementary threaded stud shroud 730. The smooth distal bore 360 fittingly accommodates the smooth head pin 740 and the smooth apical bore 400 accommodates the smooth tail pin 760. In the fully inserted position, the distally-facing step 380 abuts the apically-facing tread 780 to act as a stop, thereby aiming to at least partially limit material passage therealong. The tail 560 of the plug 500 stands away from the bottom 390 of the cavity 300 forming a gap 800 therebetween.

In another embodiment, the present disclosure provides a method for removably plugging a hollow implant [such as the implant 100 shown and explained in conjunctions with FIGS. 1-2] with a plug [such as the plug 500 shown and explained in conjunction with FIGS. 1-2]. The implant 100 comprises a distal opening at a distal end 160 extending in a cavity 300 inside implant body 120 and meeting an apical end 140 of the implant. The plug 500 comprises a distally disposed head 540 extending towards an apically disposed tail 560 through a peripheral shroud 580 extending therebetween and merging therewith. The plug 500 is inserted into the cavity 300 from the distal opening 310 towards the apical end 140 such that when the plug 500 is fully inserted in the cavity 300, the tail 560 of the plug 500 stands away from a bottom 390 of the cavity 300 of the implant.

Further, the method comprises inserting the removable plug 500 into the implant 100 in a single step such that when the plug is inserted completely within the implant, it fittingly accommodates within the implant.

Such arrangement of a removable plug 500 within the implant body 120 substantially limits passage of any material along and through the implant body 120. The plug 500 comprises a connector such as a socket 560 which may be used to remove the plug 500 from the implant body 120 if required. In some embodiments, a manual and/or mechanical [including electric, and/or fluidic powered] driving device [not shown] with a suitable bit attachment may be connected to the connector of the plug 500 and is used for insertion and/or removal of the plug 500 to and from the implant 100.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present disclosure, and hence, may not be construed to create limitations, particularly as to the position, orientation, or use of the devices and/or methods disclosed herein.

Additionally, all numerical terms, such as, but not limited to, "first", "second", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

It is intended that all matter contained in the above description or shown in the accompanying drawings shall be interpreted as illustrative only and not limiting of the scope of the disclosure. Changes in detail or structure may be made without departing from the spirit of the present disclosure as defined in the appended claims.

While certain exemplary embodiments have been described and shown in the accompanying drawings, it is to be understood that such embodiments are merely illustrative of and not restrictive on the broad present disclosure, and that this present disclosure is not limited to the specific constructions and arrangements shown and described, since various other modifications and/or adaptations may occur to those of ordinary skill in the art. It is to be understood that individual features shown or described for one embodiment may be combined with individual features shown or described for another embodiment. It is to be understood that some features are shown or described to illustrate the use of the present disclosure in the context of functional segments and such features may be omitted within the scope of the present disclosure and without departing from the spirit of the present disclosure as defined in the appended claims.

The invention claimed is:

1. A pluggable implant, comprising:
an implant body extending between a distal end and an apical end,
a cavity extending from said distal end of said implant body towards said apical end of said implant body, wherein said cavity defined within said implant body comprises a distal cavity extending from said distal end of said implant body toward said apical end of said implant body, and an apical cavity extending from said apical end of said implant body toward said distal end of said implant body, and wherein a chamfered step is defined within a peripheral wall portion of said cavity located near said apical end of said implant body so as to be interposed between said distal cavity and said apical cavity so as to permit said distal cavity and said apical cavity to merge with each other, wherein the implant body comprises a peripheral envelope extending between the distal end and the apical end, the implant body is provided with one or more openings formed in the peripheral envelope adjacent the apical end that lead inwardly of the envelope through the implant body to merge with the cavity forming corresponding one or more ducts; and a plug having a body portion having a head pin section and a tail pin section, removably inserted into said distal end of said implant body and extending towards said apical end of said implant body, and including a chamfered peripheral wall portion interposed between said head pin section and said tail pin section for engaging said chamfered step defined within said peripheral wall portion of said cavity of said implant body so as to ensure that when said plug is fully inserted and located entirely within said cavity of said implant body, said plug fully seals said cavity of said implant body and said plug is disposed apically away from a bottom of the cavity forming a cavity therebetween.

2. The implant of claim 1, wherein the cavity comprises a threaded distal cavity and a smooth apical cavity.

3. The implant of claim 1, wherein the plug comprises a distal head extended towards an apical tail through a peripheral shroud.

4. The implant of claim 3, wherein the plug comprises a distally disposed stud having a stud shroud extending axially in a direction away from the distal head towards the apical tail.

5. The implant of claim 4, wherein the distally disposed stud shroud is threaded.

6. The implant of claim 3, wherein the plug comprises the head pin section having a head shroud extending away from the distally disposed stud shroud and merging with the tail pin section having a tail shroud extending toward the peripheral wall portion, which is apically-facing.

7. The implant of claim 1, wherein the plug comprises a connector to facilitate interface with external objects.

8. The implant of claim 7, wherein the connector is a hex-socket.

9. The pluggable implant of claim 1, wherein the apical end has a smooth, sealed apical face.

10. The pluggable implant of claim 1, wherein the distal cavity is threaded and the apical cavity is smooth.

11. The pluggable implant of claim 1, wherein the plug comprises a stud that is disposed distally of the head pin section, and the stud has a stud shroud.

12. The pluggable implant of claim 11, wherein the stud shroud is threaded.

13. The pluggable implant of claim 1, wherein the head pin section has a head shroud, the tail pin section has a tail shroud, wherein the head shroud, the tail shroud and the interposed chamfered peripheral wall portion is smooth.

14. The pluggable implant of claim 1, wherein the apical cavity comprises a distal bore merging with an apical bore through the peripheral wall portion of the cavity.

15. The pluggable implant of claim 14, wherein the distal bore receives the head pin section and the apical bore receives the tail pin section.

16. The pluggable implant of claim 15, wherein the distal bore, the apical bore and the peripheral wall portion of the cavity are smooth.

17. A method for plugging a hollow implant, comprising the steps of:
providing an implant body which extends between a distal end and an apical end; providing a cavity extending from said distal end of said implant body towards said apical end of said implant body, wherein said cavity defined within said implant body comprises a distal cavity extending from said distal end of said implant body toward said apical end of said implant body, and an apical cavity extending from said apical end of said implant body toward said distal end of said implant body, and wherein a chamfered step is defined within a peripheral wall portion of said cavity located near said apical end of said implant body so as to be interposed between said distal cavity and said apical cavity so as to permit said distal cavity and said apical cavity to merge with each other, wherein the implant body comprises a peripheral envelope extending between the distal end and the apical end, the implant body is provided with one or more openings formed in the peripheral envelope adjacent the apical end that lead inwardly of the envelope through the implant body to merge with the cavity forming corresponding one or more ducts;

providing a plug having a body portion, having a head pin section and a tail pin section, removably insertable into said distal end of said implant body and extending towards said apical end of said implant body, and including a chamfered peripheral wall portion interposed between said head pin section and said tail pin section for engaging said chamfered step defined within said peripheral wall portion of said cavity of said implant body; and fully inserting said plug into said implant body so that the plug is located entirely internally within said cavity of said implant body, so that said plug fully seals said cavity of said implant body, and so that said plug is disposed apically away from a bottom of the cavity forming a cavity therebetween.

* * * * *